United States Patent
Diamond

[15] 3,703,003
[45] Nov. 14, 1972

[54] D.C. LEVEL CONTROLLER
[72] Inventor: Paul Diamond, Framingham, Mass.
[73] Assignee: Raytheon Company, Lexington, Mass.
[22] Filed: April 30, 1971
[21] Appl. No.: 139,119

[52] U.S. Cl. .............343/7 A, 315/27 TD, 343/16 M
[51] Int. Cl. ....................................................G01s 9/22
[58] Field of Search..........343/7 A, 16 M, 17.7, 114, 114.5; 315/27 TD

[56] References Cited

UNITED STATES PATENTS

| | | | |
|---|---|---|---|
| 3,249,934 | 5/1966 | Hague | 343/7 A |
| 3,275,847 | 9/1966 | Kitchin | 315/27 TD |
| 3,328,796 | 6/1967 | Follen et al. | 343/7 A |
| 3,134,927 | 5/1964 | Haines | 315/7 TD |

Primary Examiner—Benjamin A. Borchelt
Assistant Examiner—G. E. Montone
Attorney—Philip J. McFarland, Joseph D. Pannone and Richard M. Sharkansky

[57] ABSTRACT

A. D.C. level controller for use in a radar receiver to compensate for drift developed in D.C. coupled video circuitry. The controller includes, a linear feedback loop, operative during intervals between periods during which signals are processed by such video circuitry, to develop a correction signal. The correction signal is stored and used to adjust the D.C. level of the signal out of the video circuitry. The linear feedback loop is so arranged that any drift generated therein is also compensated.

3 Claims, 1 Drawing Figure

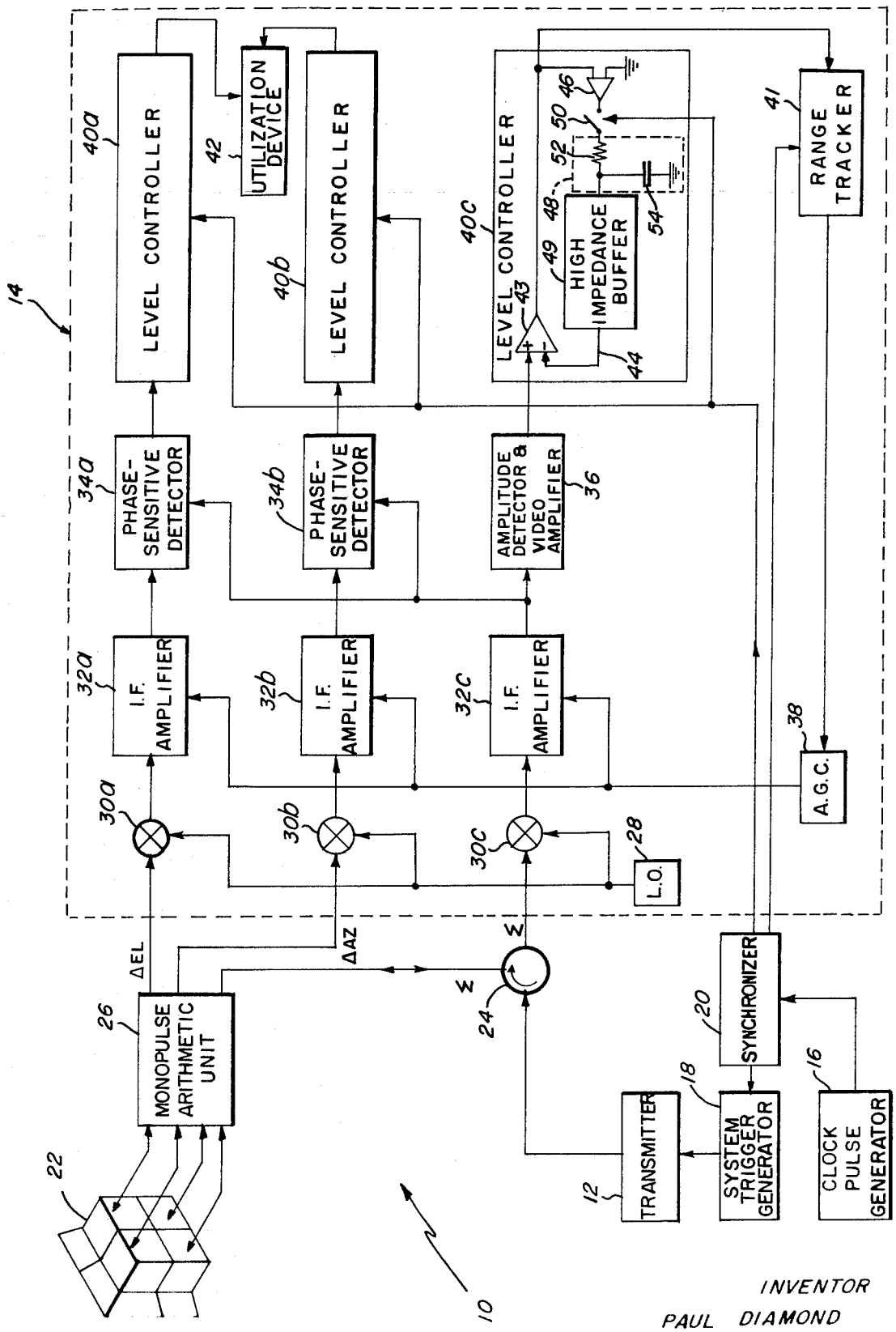

D.C. LEVEL CONTROLLER

The invention herein described was made in the course of or under a contract or subcontract thereunder, with the Department of Defense.

BACKGROUND OF THE INVENTION

This invention pertains generally to D.C. level controllers and more particularly to D.C. level controllers used in tracking radar receivers.

As is known in the art, tracking radar systems are used to obtain data relating the angle between the boresight axis of an antenna of a radar system and line of sight between such antenna and a target tracked by such radar system. Such angle is generally defined in terms of an azimuth angle and an elevation angle. Such angle data generally is derived by processing radar echo returns at radio frequency in a heterodyne receiver to obtain corresponding angle information at video frequency. Such video frequency angle information occurs in the receiver as signals made up of frequencies at substantially D.C.. Consequently, processing of such video frequency angle information requires that D.C. coupled circuitry be used in the receiver. As is also known, D.C. coupled circuitry has the inconvenient characteristic that the D.C. level of the output signal processed by such circuitry is subject error due primarily to thermally produced drifts. Such drifts, in turn, result in inaccuracy in the measurement of the desired angles.

One technique frequently used to reduce the error in angle measurement caused by such drifts has been periodically to provide a feedback network with a high gain element whereby the D.C. level at the output of such video circuitry may be corrected. The correction signal produced by the high gain element is stored so that, when a video signal is again applied to the video processing circuitry, the D.C. level of such an applied video signal is changed in accordance with the level of the stored correction signal. The signal produced by the feedback network is, therefore, a video signal with a properly corrected D.C. level.

Prior to this invention feedback networks have included a modulator for converting the signal appearing at the output of the feedback network from a D.C. signal to an A.C. signal. Thus, an A.C. amplifier could be used as the high gain element. The amplified A.C. signal could then be processed by a demodulator to convert such A.C. amplified signal into the D.C. signal correction signal. Such a D.C. signal could be stored and used in the manner described above. Such particular arrangements have the advantage that there are no drifts in the high gain element; however, such arrangements have the disadvantage in that, when packaging requirements are considered, the A.C. signal produced in the feedback network may couple into other circuitry included in the radar receiver. Such coupling obviously can affect the performance and accuracy of the radar receiver.

SUMMARY OF THE INVENTION

It is, therefore, a specific object of this invention to provide an improved D.C. level controller for use in a radar tracking system.

This and other objects of the invention are attained generally by coupling, to the output of the video processing circuitry used in a radar tracking system receiver, a D.C. level controller, such controller including a feedback network with a high gain feedback element, and control means operative periodically (when the video signal applied to the video processing circuitry is removed from such circuitry) to provide a correction signal of proper magnitude. The high gain feedback element includes a high gain differential amplifier for amplifying the difference between the D.C. level at the output of feedback network and a reference voltage. Thus, any change in the level of the signal produced by the differential amplifier reflects the drift in the D.C. level of the video processing circuitry when video signals are not applied thereto. The signal out of the differential amplifier, then, is sampled at intervals between the intervals in which video signals are to be received and the resulting sampled signal is applied to a filter to form the correction signal required at any given time. Such a correction signal then is applied to a second differential amplifier in the video processing circuitry to compensate for any drift in the video signals being processed.

BRIEF DESCRIPTION OF THE DRAWINGS

Other objects and many of the attendant advantages of the invention will be readily appreciated as the same becomes better understood by reference to the following description of the accompanying drawings wherein the single FIGURE shows a monopulse radar receiver employing the invention.

DESCRIPTION OF THE PREFERRED EMBODIMENTS

Referring now to the FIGURE, a tracking radar system 10 is shown. Tracking radar system 10 is made up of a transmitter 12 and a receiver, here a monopulse receiver 14, such transmitter and receiver being controlled in a conventional manner by clock pulse generator 16, system trigger generator 18 and synchronizer 20, whereby synchronizer 20 sends signals to system trigger generator 18 in response to clock pulses from the clock pulse generator 16. During the transmit phase of operation of the illustrated system, transmitter 12, in response to the signals from system trigger generator 18, transmits radio frequency energy to the four quadrants (not numbered) of a monopulse antenna 22. Such energy passes to the monopulse antenna 22 via circulator 24 and the sum channel, $\Sigma$, of monopulse arithmetic unit 26 in a conventional manner, as shown. Transmitted radio frequency energy, after reflection from a target, not shown, returns to the monopulse antenna 22. The angle between the boresight of antenna 22 and the line of sight to any target is obtained by monopulse receiver 14. In particular, during the receive phase, radio frequency energy reflected by any target is received in each of the four quadrants of monopulse antenna 22. The energy so received is processed by monopulse arithmetic unit 26 in a conventional manner to produce a sum signal $\Sigma$, an elevation difference signal, $\Delta EL$, and an azimuth difference signal, $\Delta AZ$. The elevation difference signal $\Delta EL$ and azimuth difference signal $\Delta AZ$ and the sum signal, $\Sigma$, are each heterodyned in a conventional manner by common local oscillator 28 and mixers 30a, 30b and 30c to produce corresponding signals at an intermediate (I.F.) frequency. Such I.F. signals are amplified by identical amplifiers 32a, 32b, and 32c, respectively. As is known, azimuth and elevation angle information is obtained by sensing, respectively, the phase change between the sum signal Σ and the azimuth difference signal, ΔAZ, and the elevation difference signal, ΔEL. Such phase sensing is accomplished by identical phase sensitive detectors 34a and 34b. Consequently, the signals produced at the output of phase sensitive detectors 34a and 34b are D.C. signals, the magnitude of each one being, respectively:

$$S34a = |\Sigma| |\Delta EL| \cos \theta EL$$

$$S34b = |\Sigma| |\Delta AZ| \cos \theta AZ$$

where:

$|\Sigma|$ = magnitude of the sum signal
$|\Delta EL|$ = magnitude of the elevation difference signal
$|\Delta AZ|$ = magnitude of the azimuth difference signal
$\theta EL$ = phase angle between the sum signal and the elevation difference signal
$\theta AZ$ = phase angle between the sum signal and the azimuth difference signal Also, as is known, in order to obtain a true measure of the azimuth and elevation angles it is necessary to normalize the gain of monopulse receiver 14. Such normalization here is achieved in a conventional manner by generating an automatic gain control (AGC) signal when the amplitude of the sum signal changes. Such generation is effected by an amplitude detector and video amplifier 36, AGC 38, level controller 40c and range tracker 41. The AGC 38 is used to adjust the gain of I.F. amplifiers 32a, 32b, and 32c so as to maintain constant angle-tracking sensitivity (volts per degree error) even though the target-echo signal varies over a large dynamic range. Also I.F. amplifiers 32a–32c are gated so that only targets within a predetermined range interval are tracked. Such gating is accomplished by means of a signal transmitted by synchronizer 20 to range tracker 41. Therefore, because the signals out of phase sensitive detectors 34a and 34b and amplitude detector and video amplifier 36 are D.C. signals, it is necessary for accurate operation of the monopulse receiver 14 that level of such signals be independent of drifts which may occur within the devices producing such signals at their respective outputs. The effect of such drifts is compensated by level controllers 40a, 40b, and 40c. The azimuth and elevation angle data is transmitted to utilization device 42. Each such controller is of identical construction and therefore only the details of level controller 40c will be described.

Level controller 40c includes a differential amplifier 43. Differential amplifier 43 generates a D.C. signal of level equal to the difference between the level of the signal out of amplitude detector and video amplifier 36 and the level of the signal on line 44. The level of the signal on line 44 is, in turn, controlled through a feedback path which includes a differential amplifier 46, a low pass filter network 48 and a high impedance buffer 49 arranged as shown. The feedback path is closed; that is, the output of differential amplifier 46 is coupled to low pass filter network 48 when an electronic switch 50 is closed. Low pass filter network 48 is comprised of a resistor 52 and capacitor 54, arranged as shown.

The operation of exemplary level controller 40c can be explained as follows: During the "receive" phase of operation of radar system 10, received signals appear at the output of amplitude detector and video amplifier 36 each time range tracker 41 allows a gating signal to be sent to I.F. amplifier 32c via AGC 38. When I.F. amplifier 32c is not so gated the D.C. level of the signal at the output of amplitude detector and video amplifier 36 is zero in the absence of any drift. However, because, in normal operation, such drifts exist, a D.C. level appears at the output of amplitude detector and video amplifier 36 even in the absence of a signal at the input thereof. During the time signals are absent from the output of I.F. amplifier 32c, synchronizer 20 transmits a signal to close the electronic switch 50 thereby completing the feedback path of level controller 40c. The gains of differential amplifier 43 and differential amplifier 46 and the values of resistor 52 and capacitor 54 are such that the level controller 40c is a stable system and reaches a steady state condition just prior to the time the next signal is produced at the output of I.F. amplifier 32a. As is well known, when such a steady state condition exists, the level of the signal on line 44 will be essentially equal to the level of the drift produced by amplitude detector and video amplifier 36. Just prior to the next signal produced at the output of I.F. amplifier 32c, synchronizer 20 sends a signal to switch 50 to open such switch; however, the steady state level of the signal appearing on line 44 is fixed by the voltage across capacitor 54. In particular, high impedance buffer 49, typically an emitter follower or other convenient circuit, prevents significant discharge of the voltage across capacitor 54 between successive closures of electronic switch 50. Thus, the voltage level on line 44 is substantially maintained (i.e., "held") at a desired level for the subsequent signals produced at the output of I.F. amplifier 32c. A little thought will make it apparent, therefore, that whereas the subsequent signal out of amplitude detector and video amplifier 36 may be at an improper D.C. level due to drift, differential amplifier 43 operates to compensate for such improper D.C. level. Consequently, the signal out of level restorer 40c has a D.C. level corresponding to the amplitude of the sum signal, Σ. It is further noted that differential amplifier 46 produces a signal which is proportional to the difference between the signal out of differential amplifier 43 and a fixed voltage reference level, here ground. Therefore, the level of the signal out of differential amplifier 46 will adjust when electronic switch 50 is closed to effectively reduce to tolerable levels any drifts produced within such differential amplifier.

Having described a preferred embodiment of this invention, it is evident that other embodiments incorporating its concepts may be used. For example, other radar receivers, such as conical scan receivers or sequential lobing receivers may employ the concepts herein described.

It is felt, therefore, that this invention should not be restricted to its disclosed embodiments but rather should be limited only by the spirit and scope of the appended claims.

What is claimed is:

1. In a radar receiver, wherein video circuitry is provided for processing received signals during predetermined intervals, and a level controller, fed by such circuitry, is provided for adjusting the level of the signal processed by such circuitry, such level controller including: a feedback network, such network having a feedback path operative between each successive pair of predetermined intervals for producing a correction signal; storage means, disposed in the feedback path, for storing the correction signal during each one of the predetermined intervals; and, first means, having a first input fed by the video circuitry and a second input fed by the storage means, for producing a signal, at an output terminal of such first means, proportional to the difference in the received signals processed by the video circuitry and the correction signal, the improvement in such level controller comprising: a second means, having a first input terminal coupled to the output terminal of the first means and a second input terminal connected to a reference voltage to produce the correction signal.

2. The improvement recited in claim 1 wherein the second means includes a differential amplifier, such amplifier having a first and second input connected to the first and second input terminal, respectively.

3. The improvement recited in claim 2 wherein the feedback path includes a switching means, operative between each successive pair of predetermined intervals, for periodically completing the feedback path.

* * * * *